UNITED STATES PATENT OFFICE.

JOSEPH C. HECKMAN, OF AVALON, PENNSYLVANIA, ASSIGNOR OF ONE-HALF TO WILLIAM J. GILMORE, OF PITTSBURG, PENNSYLVANIA.

PIGMENT.

No. 887,042.     Specification of Letters Patent.     Patented May 5, 1908.

Application filed June 12, 1907. Serial No. 378,655.

*To all whom it may concern:*

Be it known that I, JOSEPH C. HECKMAN, a resident of Avalon, in the county of Allegheny and State of Pennsylvania, have invented a new and useful Improvement in Pigments; and I do hereby declare the following to be a full, clear, and exact description thereof.

My invention relates to pigments.

The object of my invention is to provide a pigment of high color and brilliancy obtained from a waste product heretofore accounted as of no commercial value.

My invention consists, generally stated, in a pigment produced by treating flue dust from iron or steel furnaces with sulfuric acid and then calcining same.

As the apparatus involved in the manufacture of my improved pigment is of a form commonly employed I have not deemed it necessary to accompany my description with drawings.

In the operation of a blast furnace for making iron great quantities of flue dust or dirt collect in the hot blast stove which have to be removed from time to time to keep the furnace in proper working order. This flue dust is composed of silica, oxid of iron, carbon, alumina, lime, &c., in varying proportions, depending upon the character of the iron or lime stone and coke employed. This flue dust has heretofore been considered as a waste product and thrown aside as refuse. In the manufacture of my improved pigment I take this flue dust and mix it with proper proportions of sulfuric or other suitable mineral acid and water. To be more exact, I may introduce into a suitable vat or reservoir one part flue dust, one fifth to one part sulfuric acid and one fifth to one part water, and after thoroughly mixing the same the mixture is allowed to stand for a suitable length of time to give the sulfuric acid sufficient time to thoroughly act on the iron and thus convert it into compounds which, through subsequent stages of the process, to wit: calcination, are readily converted into oxid of iron. The reaction between the iron and the sulfuric acid gives sulfate of iron, which in its crystalline form is well known as copperas. In my process, however, the sulfate of iron formed is in a hydrated form and is merely an intermediary product which has no resemblance to the commercial article known as copperas.

After the mixture has stood for the length of time required, say, from twelve to thirty-six hours, the mixture will be in the form of a semi-fluid or pasty mass through the chemical reactions taking place. This mixture I then introduce into a suitable muffle or reverberatory furnace where heat is applied and the mass is calcined and reduced to a pulverulent form. I thus obtain a pigment which is very rich in iron oxid of a very brilliant red in coloring and very strong in tinting capacity. By increasing the proportion of the sulfuric acid up to a certain point a high color and strength is obtained. This increase in sulfuric acid, however, depends upon the amount of metallic iron contained in the flue dust from which the pigment is made. The pigment so produced may then be mixed with suitable oils, turpentine, &c., to produce paint adapted for iron or wood work. Furthermore, the pigment may also be employed for coloring many other lines of manufacture.

By my invention I make use of a waste product and give it a high commercial value, while at the same time the pigment obtained therefrom has a high color and has great strength as the present established standard at greatly reduced cost. In addition to this blast furnace flue dust I may also employ the flue dust which collects in the dust catchers of open hearth furnaces and which consists primarily of iron ore and lime dust. This flue dust may be treated in the same manner as above set forth to produce the pigment.

What I claim is:

1. As a new product of manufacture, a pigment formed from furnace flue dust by treating same with a mineral acid and calcining the same.

2. As a new product of manufacture, a pigment formed from furnace flue dust by treating same with sulfuric acid and calcining same.

In testimony whereof, I the said JOSEPH C. HECKMAN have hereunto set my hand.

JOSEPH C. HECKMAN.

Witnesses:
ROBERT C. TOTTEN,
ROBT. D. TOTTEN.